(12) United States Patent
Chung et al.

(10) Patent No.: US 10,970,512 B2
(45) Date of Patent: Apr. 6, 2021

(54) FINGERPRINT SENSING APPARATUS AND METHOD HAVING LARGE-AREA SENSING MECHANISM

(71) Applicant: NOVATEK Microelectronics Corp., Hsinchu (TW)

(72) Inventors: Jung-Chen Chung, Hsinchu County (TW); Chi-Ting Chen, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 16/424,506

(22) Filed: May 29, 2019

(65) Prior Publication Data

US 2020/0380235 A1 Dec. 3, 2020

(51) Int. Cl.
*G06K 9/00* (2006.01)
*G06K 9/20* (2006.01)

(52) U.S. Cl.
CPC ....... *G06K 9/0004* (2013.01); *G06K 9/00026* (2013.01); *G06K 9/00986* (2013.01); *G06K 9/209* (2013.01)

(58) Field of Classification Search
None
See application file for complete search history.

(56) References Cited

U.S. PATENT DOCUMENTS

| | | | |
|---|---|---|---|
| 2016/0188950 A1* | 6/2016 | Liu | G06K 9/00046 348/77 |
| 2019/0278970 A1* | 9/2019 | Naruse | G06T 1/00 |

* cited by examiner

*Primary Examiner* — Joseph R Haley
(74) *Attorney, Agent, or Firm* — CKC & Partners Co., LLC

(57) ABSTRACT

A fingerprint sensing apparatus having a large-area sensing mechanism is provided that includes at least three optical fingerprint sensing circuits and a processing circuit. The at least three optical fingerprint sensing circuits are configured to perform sensing within a plurality of sensing areas to obtain a plurality of sensed images, wherein each of the sensing areas corresponds to one of the optical fingerprint sensing circuits. The processing circuit is electrically coupled to the optical fingerprint sensing circuits to receive the sensed images and is configured to splice the sensed images together to form an integrated sensed image.

8 Claims, 4 Drawing Sheets

FINGERPRINT SENSING APPARATUS AND METHOD HAVING LARGE-AREA SENSING MECHANISM

BACKGROUND

Field of Invention

The present invention relates to a fingerprint sensing technology. More particularly, the present invention relates to a fingerprint sensing apparatus and a fingerprint sensing method having a large-area sensing mechanism.

Description of Related Art

With increasing demand for tougher security, electronic devices such as smartphones have unanimously adopted optical fingerprint sensors as they can be embedded underneath the display glass and only require a small area footprint. However, the accuracy of the fingerprint sensing technology is related to the total area that the fingerprint sensing apparatus can sense. In conventional designs, either a large sensor or a lens with a greater magnification ability is used, while a high yield rate of the large sensor is hard to accomplish and an edge of the image obtained by a lens having greater magnification ability is easy to be twisted.

Accordingly, what is needed is a fingerprint sensing apparatus and a fingerprint sensing method having a large-area sensing mechanism to address the issues mentioned above.

SUMMARY

An aspect of the present invention is to provide a fingerprint sensing apparatus having a large-area sensing mechanism that includes at least three optical fingerprint sensing circuits and a processing circuit. The at least three optical fingerprint sensing circuits are configured to perform sensing within a plurality of sensing areas to obtain a plurality of sensed images, wherein each of the sensing areas corresponds to one of the optical fingerprint sensing circuits. The processing circuit is electrically coupled to the optical fingerprint sensing circuits to receive the sensed images and is configured to splice the sensed images together to form an integrated sensed image.

Another aspect of the present invention is to provide a fingerprint sensing method having a large-area sensing mechanism used in a fingerprint sensing apparatus that includes the steps outlined below. Sensing within a plurality of sensing areas is performed by at least three optical fingerprint sensing circuits to obtain a plurality of sensed images, wherein each of the sensing areas corresponds to one of the optical fingerprint sensing circuits. The sensed images are received and the sensed images are spliced together to form an integrated sensed image by a processing circuit electrically coupled to the optical fingerprint sensing circuits.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
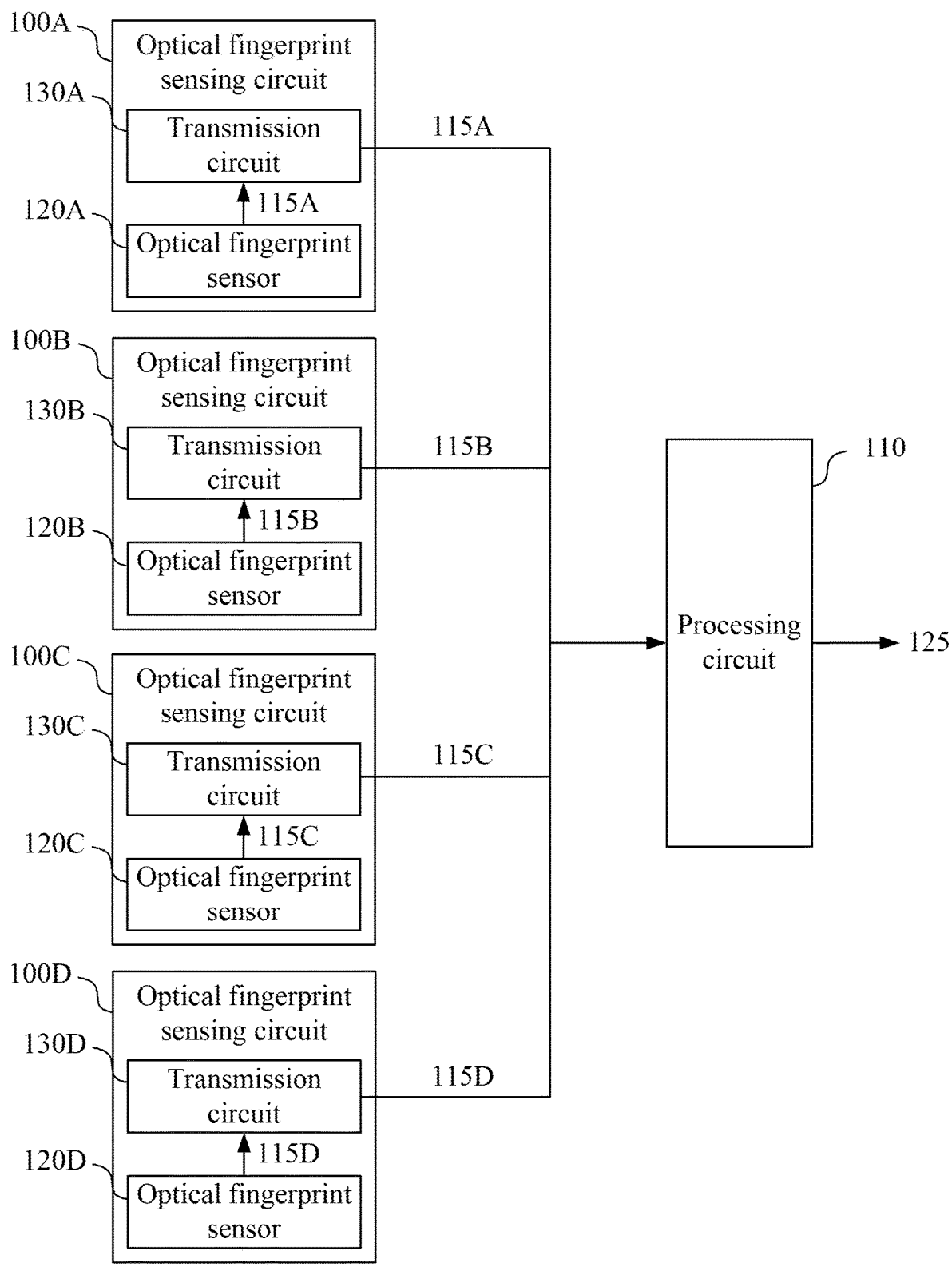
FIG. 1 is a diagram of a block diagram of a fingerprint sensing apparatus having a large-area sensing mechanism in an embodiment of the present invention.
Figure 2:
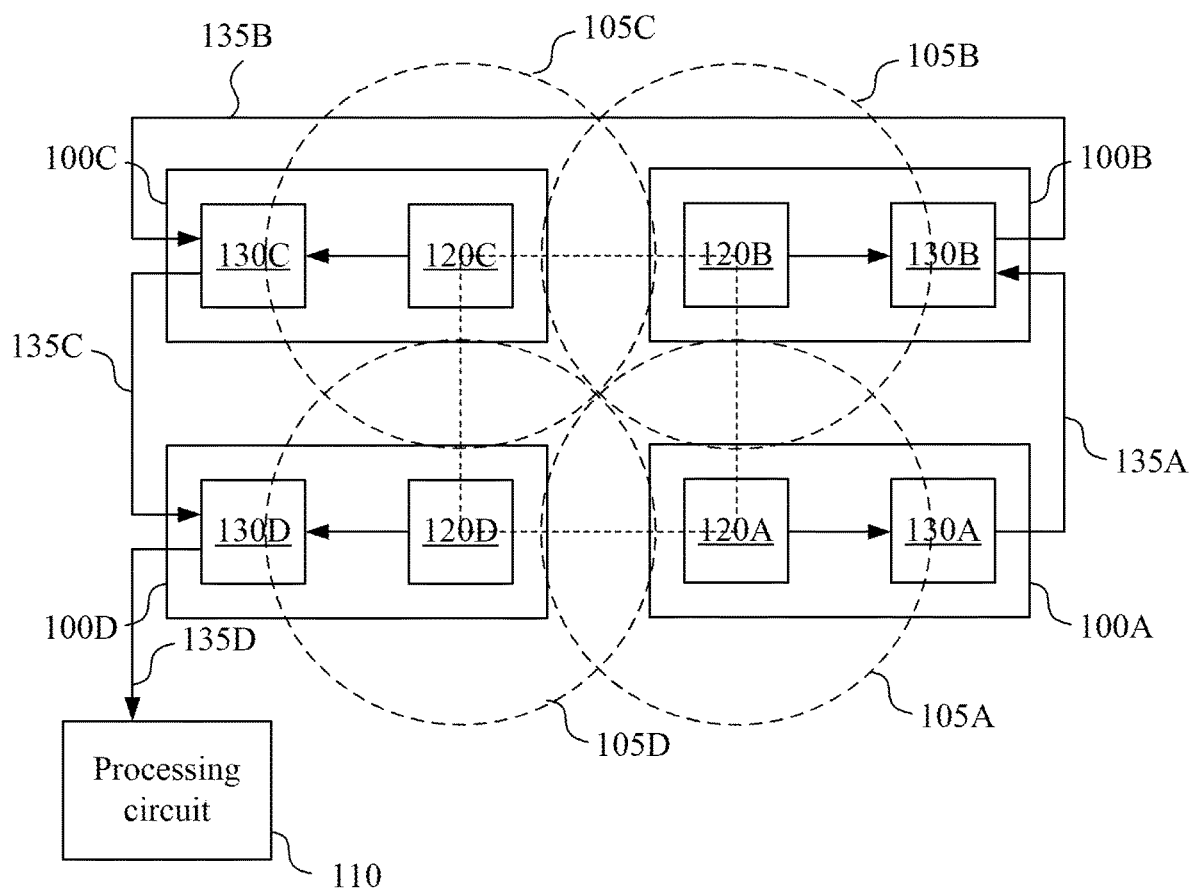
FIG. 2 is a top view of the fingerprint sensing apparatus in FIG. 1 in an embodiment of the present invention.

Reference is made to FIG. 1 and FIG. 2 at the same time. FIG. 1 is a diagram of a block diagram of a fingerprint sensing apparatus 1 having a large-area sensing mechanism in an embodiment of the present invention. The fingerprint sensing apparatus 1 includes optical fingerprint sensing circuits 100A-100D and a processing circuit 110. FIG. 2 is a top view of the fingerprint sensing apparatus 1 in FIG. 1 in an embodiment of the present invention.

The optical fingerprint sensing circuits 100A-100D are configured to perform sensing within sensing areas 105A-105D illustrated in FIG. 2 to obtain a plurality of sensed images 115A-115D.

In an embodiment, each of the optical fingerprint sensing circuits 100A-100D includes an optical fingerprint sensor and a transmission circuit. As illustrated in FIG. 1 and FIG. 2, the optical fingerprint sensing circuit 100A includes an optical fingerprint sensor 120A and a transmission circuit 130A. The optical fingerprint sensing circuit 100B includes an optical fingerprint sensor 120B and a transmission circuit 130B. The optical fingerprint sensing circuit 100C includes an optical fingerprint sensor 120C and a transmission circuit 130C. The optical fingerprint sensing circuit 100D includes an optical fingerprint sensor 120D and a transmission circuit 130D.

Each of the optical fingerprint sensors 120A-120D is configured to perform sensing within one of the sensing areas 105A-105D to obtain one of the sensed images 115A-115D. More specifically, the optical fingerprint sensor 120A performs sensing within the sensing area 105A to obtain the sensed image 115A. The optical fingerprint sensor 120B performs sensing within the sensing area 105B to obtain the sensed image 115B. The optical fingerprint sensor 120C performs sensing within the sensing area 105C to obtain the sensed image 115C. The optical fingerprint sensor 120D perform sensing within the sensing area 105D to obtain the sensed image 115D.

In an embodiment, each of the sensing areas 105A-105D is a circular shape, in which each of the optical fingerprint sensors 120A-120D is located at a center of each of the sensing areas 105A-105D.

Figure 3:
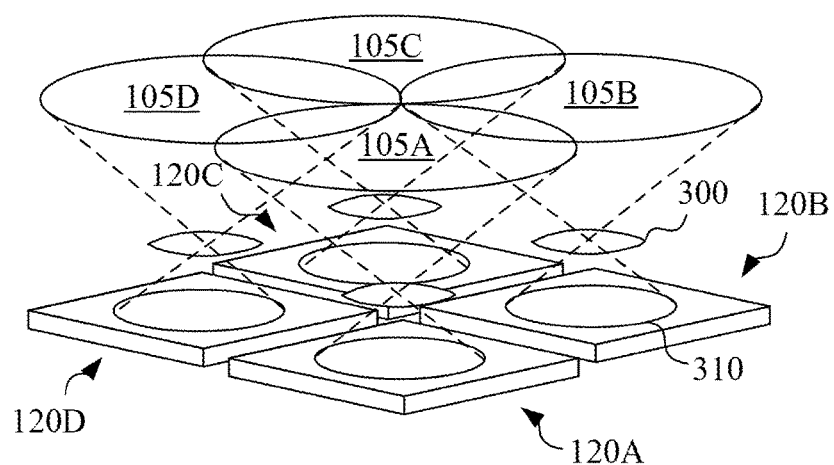
FIG. 3 is a three-dimensional diagram of the optical fingerprint sensors together with projections of the sensing areas in an embodiment of the present invention.

Reference is now made to FIG. 3. FIG. 3 is a three-dimensional diagram of the optical fingerprint sensors 120A-120D together with projections of the sensing areas 105A-105D in an embodiment of the present invention.

In an embodiment, each of the optical fingerprint sensors 120A-120D may include a lens 300 and a sensor 310. When an object, e.g. a finger, is presented within the sensing areas 105A-105D, the sensor 310 can perform sensing on the object through the lens 300 to obtain the sensed images 115A-115D that includes the information of the object, e.g. fingerprints.

In an embodiment, the size of the sensing area 105A is the projection of the size of the sensor 310 through the focal point of the lens 300. More specifically, the size of the sensing area 105A depends on the size of the sensor 310 and the distances between the object and the lens 300 and between the lens 300 and the sensor 310.

Each of the transmission circuits 130A-130D is electrically coupled to one of the optical fingerprint sensors 120A-120D and is configured to transmit one of the sensed images 115A-115D to the processing circuit 110. More specifically, the transmission circuit 130A is electrically coupled to the optical fingerprint sensor 120A and is configured to transmit the sensed image 115A to the processing circuit 110. The transmission circuit 130B is electrically coupled to the optical fingerprint sensor 120B and is configured to transmit the sensed image 115B to the processing circuit 110. The transmission circuit 130C is electrically coupled to the optical fingerprint sensor 120C and is configured to transmit the sensed image 115C to the processing circuit 110. The transmission circuit 130D is electrically coupled to the optical fingerprint sensor 120D and is configured to transmit the sensed image 115D to the processing circuit 110.

In an embodiment, the transmission circuits 130A-130D are electrically coupled in series by using such as, but not limited to transmission buses 135A-135D to form a chain and the chain is further electrically coupled to the processing circuit 110. More specifically, the transmission bus 135 electrically couples the transmission circuits 130A and 130B. The transmission bus 135B electrically couples the transmission circuits 130B and 130C. The transmission bus 135C electrically couples the transmission circuits 130C and 130D. The transmission bus 135D electrically couples the transmission circuit 130D and the processing circuit 110.

Accordingly, the sensed images 115A-115D are transmitted along the chain to the processing circuit 110. In an embodiment, the transmission buses 135A-135D can be implemented by using such as, but not limited to serial peripheral interface (SPI).

By using the design of the series-connected transmission circuits 130A-130D, less number of ports are required to be disposed on the processing circuit 110 for the transmission of the sensed images 115A-115D.

The processing circuit 110 is electrically coupled to the optical fingerprint sensing circuits 100A-100D, e.g. the transmission circuits 130A-130D, to receive the sensed images 115A-115D and is configured to splice the sensed images 115A-115D together to form an integrated sensed image 125.

As a result, the fingerprint sensing apparatus 1 of the present invention can use the optical fingerprint sensing circuits 100A-100D to generate the sensed images 115A-115D of an object located within the sensing areas 105A-105D and splice the sensed images 115A-115D together to form the integrated sensed image 125 that covers an area larger than the respective sensing areas 105A-105D to accomplish a large-area sensing mechanism.

In an embodiment, as illustrated in FIG. 2, the sensing areas 105A-105D of at least part of the optical fingerprint sensors are overlapped. Further, in an embodiment, as illustrated in FIG. 2, the centers of the sensing areas 105A-105D are arranged to form a square, in which no more than two of the sensing areas 105A-105D are overlapped at the same time and the sensing areas 105A-105D together form a continuous area. Under such a condition, the effective usage of the sensing areas 105A-105D is 81.8% due to the presence of the overlapped area.

Figure 4:
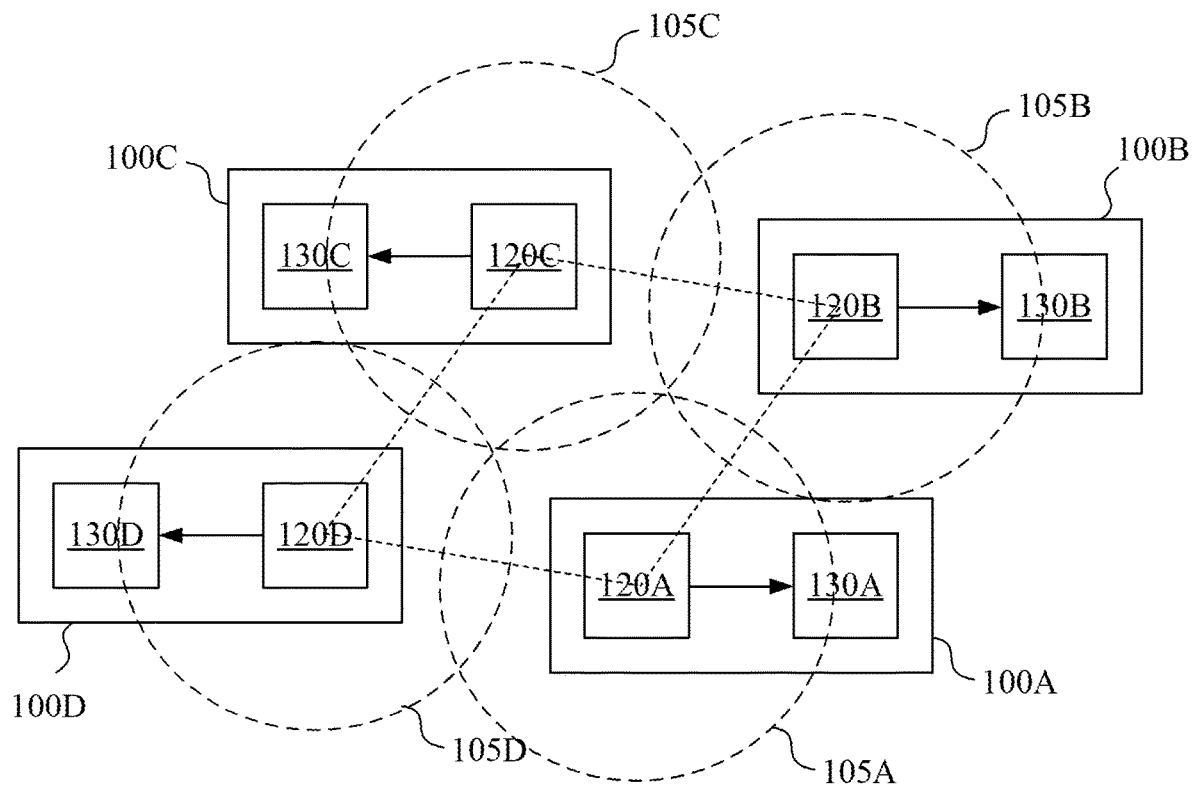
FIG. 4 is a top view of the optical fingerprint sensing circuits in FIG. 1 in another embodiment of the present invention.

Reference is now made to FIG. 4. FIG. 4 is a top view of the optical fingerprint sensing circuits 100A-100D in FIG. 1 in another embodiment of the present invention.

In the present embodiment, the centers of the sensing areas 105A-105D are arranged to form a parallelogram, in which no more than two of the sensing areas 105A-105D are overlapped at the same time and the sensing areas 105A-105D together form a continuous area. Under such a condition, the effective usage of the sensing areas 105A-105D is 92.8% due to the presence of the overlapped area.

Figure 5:
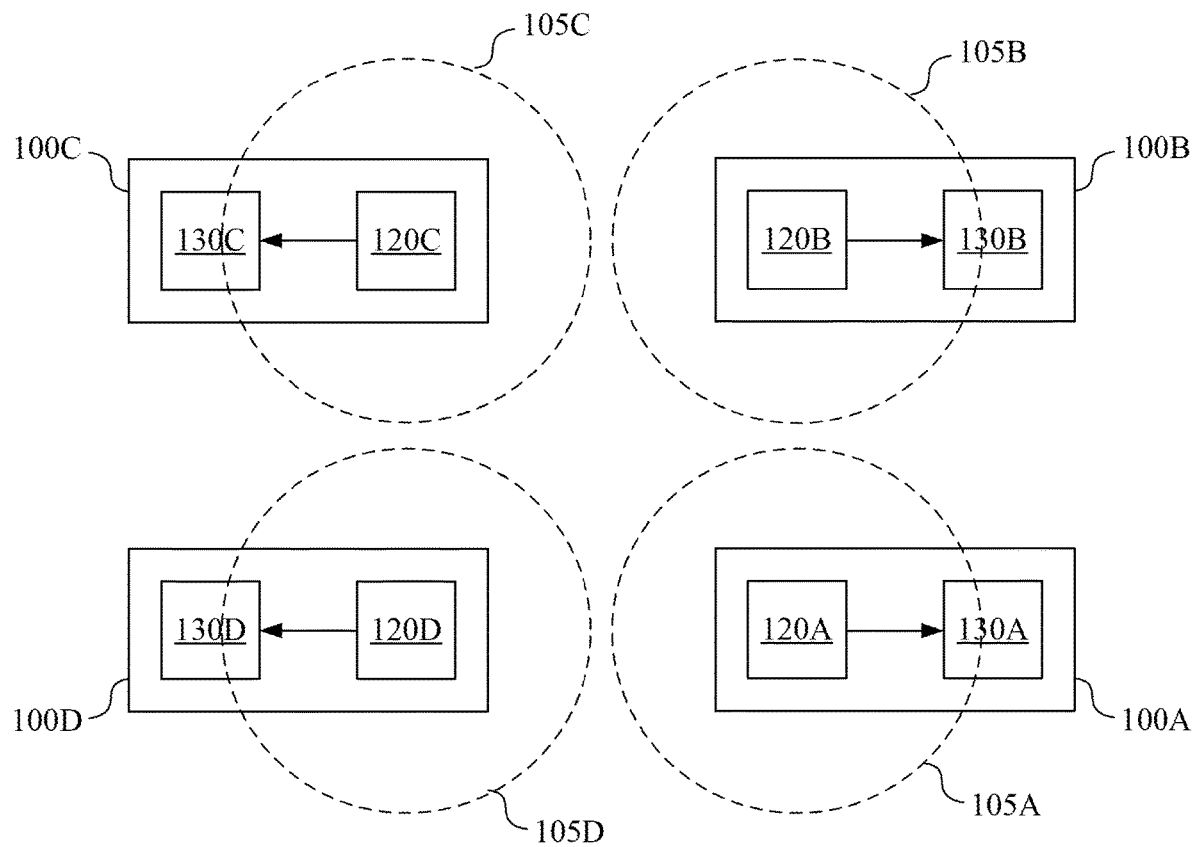
FIG. 5 is a top view of the optical fingerprint sensing circuits in FIG. 1 in yet another embodiment of the present invention.

Reference is now made to FIG. 5. FIG. 5 is a top view of the optical fingerprint sensing circuits 100A-100D in FIG. 1 in yet another embodiment of the present invention.

In the present embodiment, the sensing areas 105A-105D are not overlapped and the sensing areas 105A-105D form a discontinuous area. Under such a condition, the effective usage of the sensing areas 105A-105D is 100% due to the absence of the overlapped area.

As a result, by using different arrangements of the optical fingerprint sensing circuits 100A-100D, the fingerprint sensing apparatus 1 can perform fingerprint sensing with different effective usage of the sensing areas 105A-105D.

It is appreciated that in the embodiments described above, four optical fingerprint sensing circuits 100A-100D are illustrated as an example. In other embodiments, the number of the optical fingerprint sensing circuits 100A-100D can be any number that equals to or is larger than three.

Figure 6:
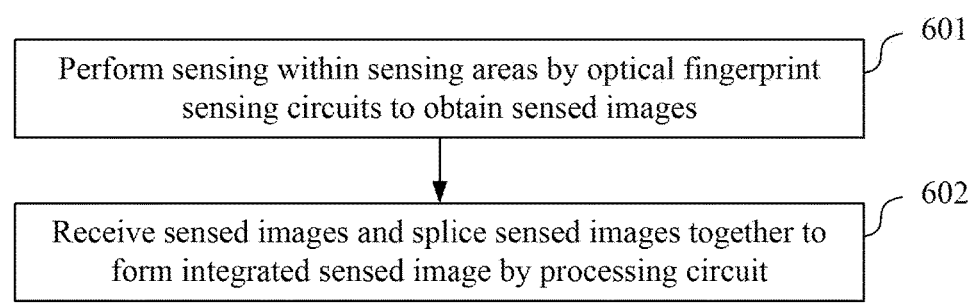
FIG. 6 is a fingerprint sensing method in an embodiment of the present invention.

Reference is now made to FIG. 6. FIG. 6 is a fingerprint sensing method 600 in an embodiment of the present invention. The fingerprint sensing method 600 can be used in the fingerprint sensing apparatus 1 illustrated in FIG. 1. The fingerprint sensing method 600 includes the operations outlined below (The operations are not recited in the sequence in which the operations are performed. That is, unless the sequence of the operations is expressly indicated, the sequence of the operations is interchangeable, and all or part of the steps may be simultaneously, partially simultaneously, or sequentially performed).

In step 601, sensing within the sensing areas 150A-105D is performed by the optical fingerprint sensing circuits 100A-100D to obtain the sensed images 115A-115D, wherein each of the sensing areas 150A-105D corresponds to one of the optical fingerprint sensing circuits 100A-100D.

In step 602, the sensed images 115A-115D are received and the sensed images 115A-115D are spliced together to form the integrated sensed image 125 by the processing circuit 110 electrically coupled to the optical fingerprint sensing circuits 100A-100D.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A fingerprint sensing apparatus having a large-area sensing mechanism, comprising:

at least three optical fingerprint sensing circuits configured to perform sensing within a plurality of sensing areas to obtain a plurality of sensed images, wherein each of the sensing areas corresponds to one of the optical fingerprint sensing circuits; and a processing circuit electrically coupled to the optical fingerprint sensing circuits to receive the sensed images and configured to splice the sensed images together to form an integrated sensed image, wherein a number of the optical fingerprint sensing circuits is 4 and a plurality centers each corresponding to one of the sensing areas are arranged to form a parallelogram;

wherein no more than two of the sensing areas are overlapped at the same time and the sensing areas together form a continuous area.

2. The fingerprint sensing apparatus of claim 1, wherein each of the sensing areas is a circular shape and the sensing areas of at least part of the optical fingerprint sensing circuits are overlapped.

3. The fingerprint sensing apparatus of claim 1, wherein each of the optical fingerprint sensing circuits comprises:

an optical fingerprint sensor configured to perform sensing within one of the plurality of sensing areas to obtain one of the sensed images; and a transmission circuit electrically coupled to the optical fingerprint sensor and configured to transmit the one of the sensed images corresponding to the optical fingerprint sensor to the processing circuit.

4. The fingerprint sensing apparatus of claim 3, wherein the transmission circuits of the optical fingerprint sensing circuits are electrically coupled in series to form a chain and the chain is further electrically coupled to the processing circuit such that the sensed images are transmitted along the chain to the processing circuit.

5. A fingerprint sensing method having a large-area sensing mechanism used in a fingerprint sensing apparatus, comprising:

performing sensing within a plurality of sensing areas by at least three optical fingerprint sensing circuits to obtain a plurality of sensed images, wherein each of the sensing areas corresponds to one of the optical fingerprint sensing circuits; and receiving the sensed images and splicing the sensed images together to form an integrated sensed image by a processing circuit electrically coupled to the optical fingerprint sensing circuits, wherein a number of the optical fingerprint sensing circuits is 4 and a plurality centers each corresponding to one of the sensing areas are arranged to form a parallelogram;

wherein no more than two of the sensing areas are overlapped at the same time and the sensing areas together form a continuous area.

6. The fingerprint sensing method of claim 5, wherein each of the sensing areas is a circular shape and the sensing areas of at least part of the optical fingerprint sensing circuits are overlapped.

7. The fingerprint sensing method of claim 5, further comprising:

performing sensing within one of the plurality of sensing areas to obtain one of the sensed images by an optical fingerprint sensor of each of the optical fingerprint sensing circuits; and transmitting the one of the sensed images corresponding to the optical fingerprint sensor to the processing circuit by a transmission circuit of each of the optical fingerprint sensing circuits electrically coupled to the optical fingerprint sensor.

8. The fingerprint sensing method of claim 7, further comprising:

electrically coupling the transmission circuits of the optical fingerprint sensing circuits in series to form a chain and further electrically coupling the chain to the processing circuit; and transmitting the sensed images along the chain to the processing circuit.

* * * * *